United States Patent
Chu et al.

(10) Patent No.: US 10,704,460 B2
(45) Date of Patent: Jul. 7, 2020

(54) RECIRCULATION VALVE FOR TURBO CHARGER ENGINE

(71) Applicants: Hyundai Motor Company, Seoul (KR); Kia Motors Corporation, Seoul (KR)

(72) Inventors: Dong Ho Chu, Gyeonggi-Do (KR); Jeong Il Lee, Gyeonggi-do (KR); Jeong Kyu Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 338 days.

(21) Appl. No.: 15/827,638

(22) Filed: Nov. 30, 2017

(65) Prior Publication Data
US 2019/0078506 A1    Mar. 14, 2019

(30) Foreign Application Priority Data

Sep. 11, 2017    (KR) .................. 10-2017-0115988
Nov. 16, 2017    (KR) .................. 10-2017-0153185

(51) Int. Cl.
*F02B 37/16* (2006.01)
*F04D 27/02* (2006.01)

(52) U.S. Cl.
CPC .......... *F02B 37/16* (2013.01); *F04D 27/0215* (2013.01)

(58) Field of Classification Search
CPC ........................... F02B 37/16; F04D 27/0215
See application file for complete search history.

(56) References Cited

U.S. PATENT DOCUMENTS

| 4,574,585 A * | 3/1986 | Conn ...................... F01D 17/08 415/27 |
| 6,142,014 A * | 11/2000 | Rilling ................... F02M 69/48 73/204.21 |
| 10,090,545 B2 * | 10/2018 | Kwon ............... H01M 8/04753 |
| 2016/0190616 A1 * | 6/2016 | Kwon ............... H01M 8/04753 429/444 |

FOREIGN PATENT DOCUMENTS

KR    20160146242 A    12/2016

* cited by examiner

*Primary Examiner* — Eric Keasel
(74) *Attorney, Agent, or Firm* — Mintz Levin Cohn Ferris Glovsky and Popeo, P.C.; Peter F. Corless

(57) ABSTRACT

A recirculation valve configured to open or close a recirculation line connected to a front stage of a compressor from a rear stage of the compressor on an intake line of an engine is provided. The valve includes a recirculation valve adaptor that has an inlet into which gas is introduced formed in a bottom thereof, having an outlet from which the gas is discharged formed in a first side of a side surface thereof, and having an inner space connected to the inlet and the outlet and in which the gas flows. A plug is configured to open or close the inlet and the outlet. The inner space has an asymmetric shape in which a width in a horizontal direction is increased in a direction from the other side of an inside surface to one side thereof.

6 Claims, 7 Drawing Sheets

RECIRCULATION VALVE FOR TURBO CHARGER ENGINE

CROSS REFERENCE TO RELATED APPLICATION

The present application claims priority to Korean Patent Application No. 10-2017-0115988, filed on Sep. 11, 2017, and to Korean Patent Application No. 10-2017-0153185, filed on Nov. 16, 2017 the entire contents of which is incorporated herein for all purposes by this reference.

BACKGROUND

1. Technical Field of the Invention

The present invention relates to a recirculation valve of opening or closing a recirculation line of a turbo charger engine, and more particularly, to a recirculation valve for a turbo charger engine installed on a recirculation line of the turbo charger engine to minimize generated surge noise by minimizing collision between gas flows during recirculation of gas.

2. Description of the Related Art

To improve acceleration performance of a vehicle, it is generally necessary to rapidly increase boost pressure. In particular, an overshoot of the boost pressure occurs, and a turbo-charger operates in an unstable region which is in the proximity of or away from a surge line on a compressor map, thereby causing surface noise. The surge noise is a phenomenon caused by a repetitive phenomenon that air supercharged through the compressor of the turbo charger is supplied insufficiently to an engine and regurgitates from an outlet pipe of the compressor, and severe surge noise and thus causes a rocking movement of the vehicle and deteriorates riding comfort.

FIG. 1 is a schematic view illustrating a general recirculation system of an engine. As illustrated in FIG. 1, according to the related art, to prevent the surge noise in the turbo charger including a turbine 20 and a compressor 30, the surge noise was solved by mainly using a software method of changing a driving region of the compressor 30 connected to the turbine 20 by improving software, and a hardware method of reducing regurgitant noise of the engine 10 side by installing a recirculation line 40, which is referred to as a recirculation system of the engine, and a recirculation valve (RCV) 50 of opening or closing the recirculation line 40.

FIG. 2 is a cross-sectional view illustrating a conventional recirculation valve (RCV). As illustrated in FIG. 2, the conventional recirculation valve 50 includes a plug 52 and an adaptor 51. Since the adaptor 51 has a protruding part 51a formed in an inner space in which gas flows and connected to the recirculation line 40, in the conventional recirculation valve 50 a fluid flow due to a step formed by the protruding part 51a collides with the gas flow which is introduced through an inlet 51b and flows in a direction of an outlet 51c thereby causing noise. Further, in the conventional recirculation valve 50 a gas flow behind the protruding part 51a and a gas flow around the protruding part 51a collide with each other in a direction of a recirculation gas flow thereby causing the noise and a noise duration time is increased as a recirculated flow rate is decreased.

The matters described as the related art have been provided merely for assisting in the understanding for the background of the present invention and should not be considered as corresponding to the related art known to those skilled in the art.

SUMMARY

An object of the present invention is to provide a recirculation valve (RCV) capable of reducing surge noise by opening or closing a circulation line and minimizing collision between gas flows during a recirculation of gas. Objects of the present invention are not limited to the above-mentioned objects. That is, other objects that are not mentioned may be obviously understood by those skilled in the art to which the present invention pertains from the following description.

According to an exemplary embodiment of the present invention, a recirculation valve opening or closing a recirculation line connected to a front stage of a compressor from a rear stage of the compressor on an intake line of an engine may include: a recirculation valve adaptor having an inlet into which gas is introduced formed in a bottom thereof, having an outlet from which the gas is discharged formed in one side surface thereof, and having an inner space connected to the inlet and the outlet and in which the gas flows; and a plug configured to open or close the inlet and the outlet, wherein the inner space may have an asymmetric shape in which a width in a horizontal direction is increased in a direction from a second side of an inside surface to a first side thereof.

The plug may be installed to be elevated in a vertical direction of the inner space, and an elevated height of the plug may be the same as a height in the vertical direction of the inner space. The recirculation line may be connected to the bottom of the recirculation valve adaptor to be connected to the inlet, and the inner space may have a cross section area which is increased upwardly from the inlet.

The recirculation valve may further include a recirculation nipple having a plurality of guide apertures formed to guide a flow of gas discharged from the outlet and supply the flow of gas to the recirculation line and having opposite ends connected to the recirculation valve adaptor and the recirculation line, respectively. The recirculation nipple may include a nipple body of a pipe shape having a first side connected to the outlet and a second side connected to the recirculation line; and a screen having the plurality of guide apertures formed therein and installed at one side of the nipple body.

The recirculation nipple may be integrally molded by the nipple body and the screen formed of a plastic material. The nipple body may have a first end connected to the outlet and may have a cross section formed in a rectangular shape to correspond to a shape of the outlet and a second end of the nipple body may have a cross section formed in a circular shape to be connected to the recirculation line. The nipple body may be formed to have the same cross section area as the cross section of the outlet in an entire region of an inner gas line in which the gas flows. The outlet may have the cross section formed in the rectangular shape and the recirculation line has the cross section formed in the circular shape, and the outlet and the recirculation line may be formed to have the same cross section area.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DETAILED DESCRIPTION

Figure 1:
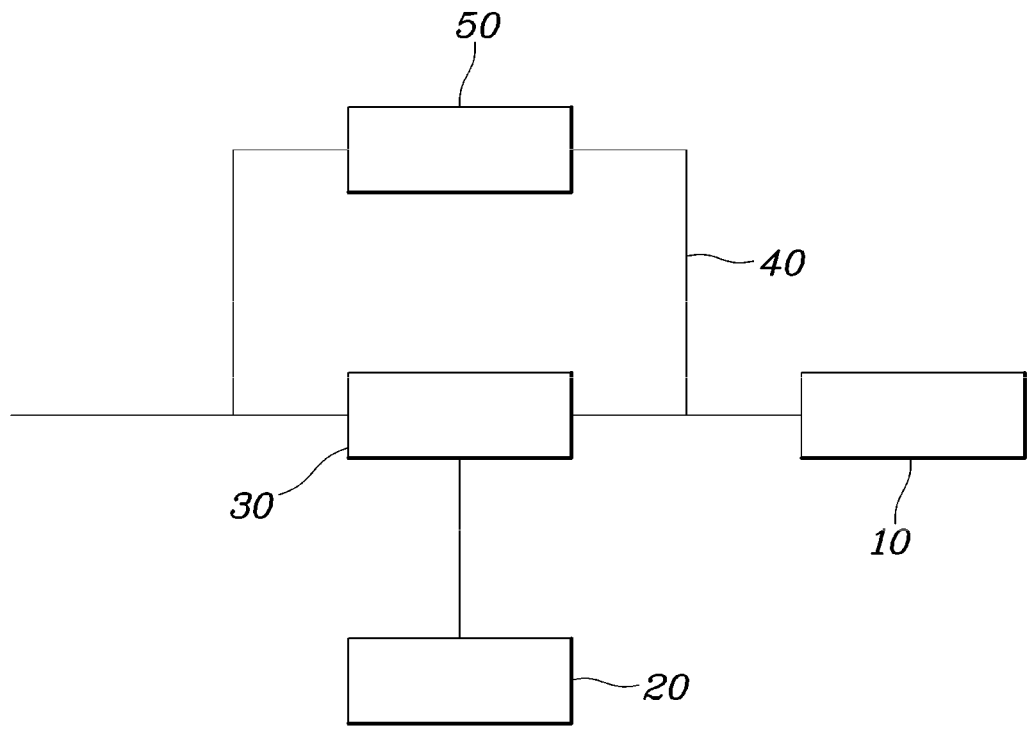
FIG. 1 is a schematic view illustrating a general recirculation system of an engine according to the related art.
Figure 2:
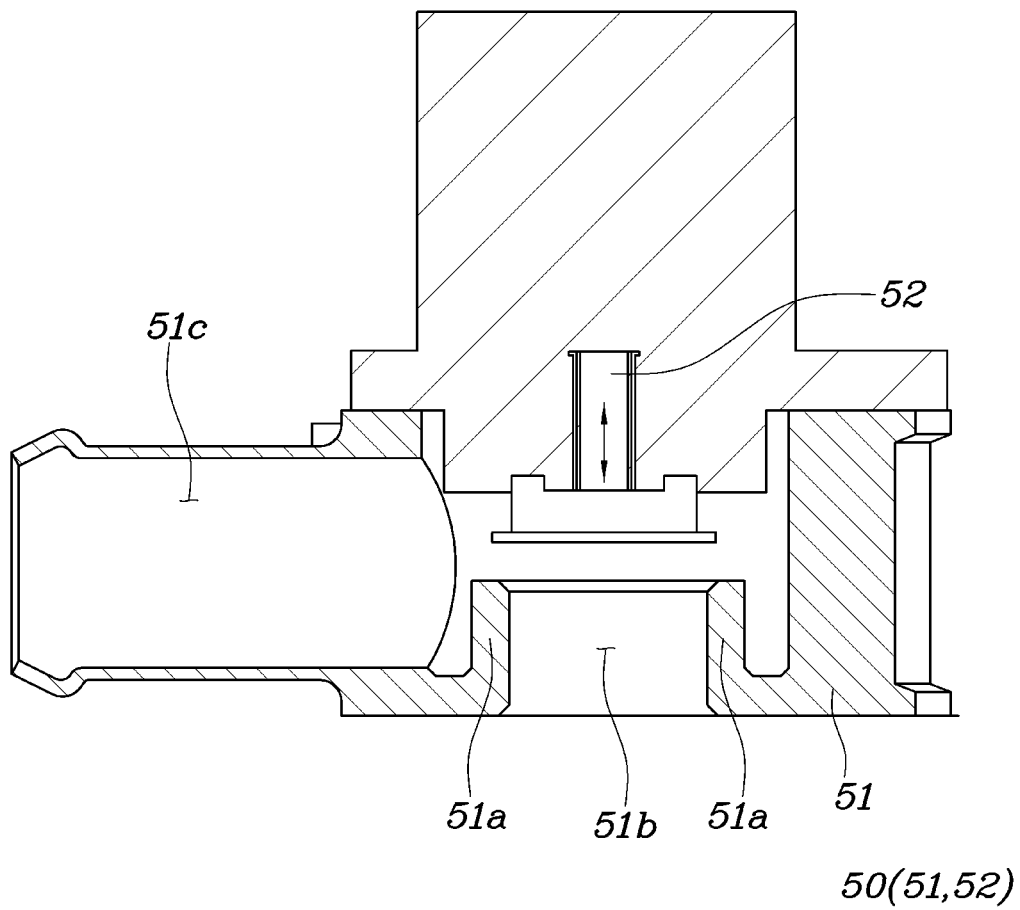
FIG. 2 is a cross-sectional view illustrating a conventional recirculation valve (RCV) according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings. However, the present invention is not limited to these exemplary embodiments. For reference, the reference numerals will be used to describe substantially the same components. Under this rule, a description may be provided while citing a content shown in other drawings and the contents well-known to those skilled in the art or the repeated contents may be omitted.

The present invention relates to a recirculation valve of opening or closing a recirculation line connected to exhaust lines of opposite sides of a compressor of a turbo charger to recirculate gas, and more particularly, to a recirculation valve capable of minimizing surge noise by minimizing collision between gas flows during a recirculation of gas by improving a structure to allow the gas to flow more smoothly without forming a step or the like in an inner portion in which the gas flows.

Figure 3:
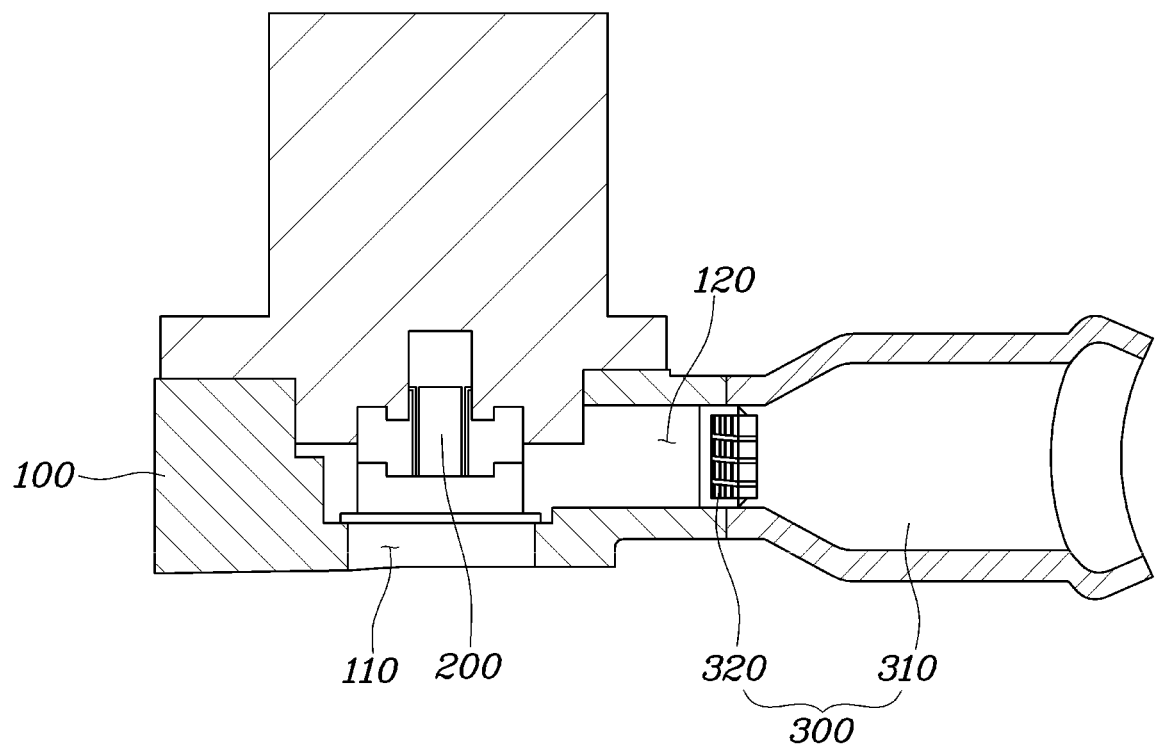
FIG. 3 is a cross-sectional view illustrating a recirculation valve for a turbo charger engine according to an exemplary embodiment of the present invention.

Hereinafter, exemplary embodiments of the present invention will be described in detail with reference to the accompanying drawings. FIG. 3 is a cross-sectional view a recirculation valve for a turbo charger engine according to an exemplary embodiment of the present invention and FIG. 4 is a view illustrating an elevated height of a plug according to an exemplary embodiment of the present invention.

Figure 4:
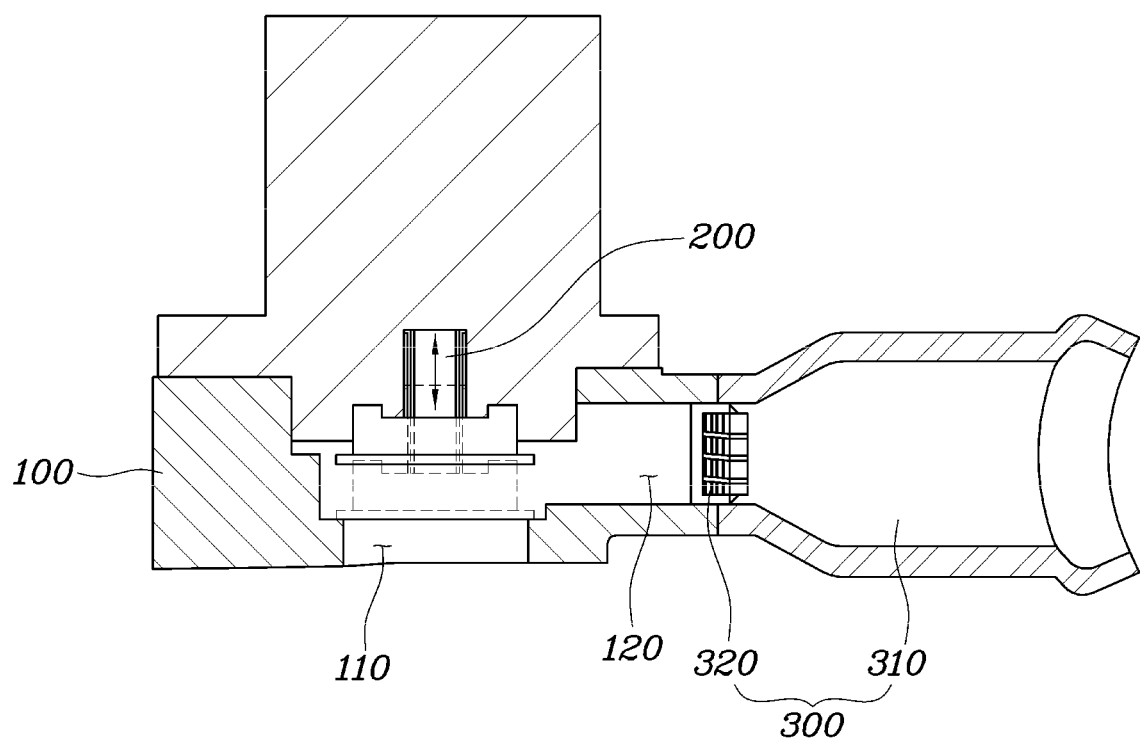
FIG. 4 is a view illustrating an elevated height of a plug according to an exemplary embodiment of the present invention.

As illustrated in FIGS. 3 and 4, a recirculation valve for a turbo charger engine according to an exemplary embodiment of the present invention may be configured to open or close a recirculation line connected with exhaust lines of opposite sides of a compressor of a turbo charger, and may include a recirculation valve adaptor 100 in which an inlet 110 into which gas is introduced, an outlet 120 from which the gas is discharged, and an inner space 130 in which the gas flows, and a plug 200 configured to open or close the inlet 110 and the outlet 120 to connect or block the recirculation line while being elevated in a direction of the inner space 130.

In particular, the plug 200 may be configured to open or close the recirculation line while being elevated in a vertical direction of the inner space 130 and an elevated height of the plug 130 may be the same as a height of the inner space 130 in the vertical direction. Accordingly, the gas introduced through the inlet 110 may be guided in a direction of the outlet 120 along an inner circumferential surface of the inner space 130, and it may be possible to prevent an eddy or regurgitation phenomenon of flowing gas due to a step or the like, thereby minimizing surge noise.

Figure 5:
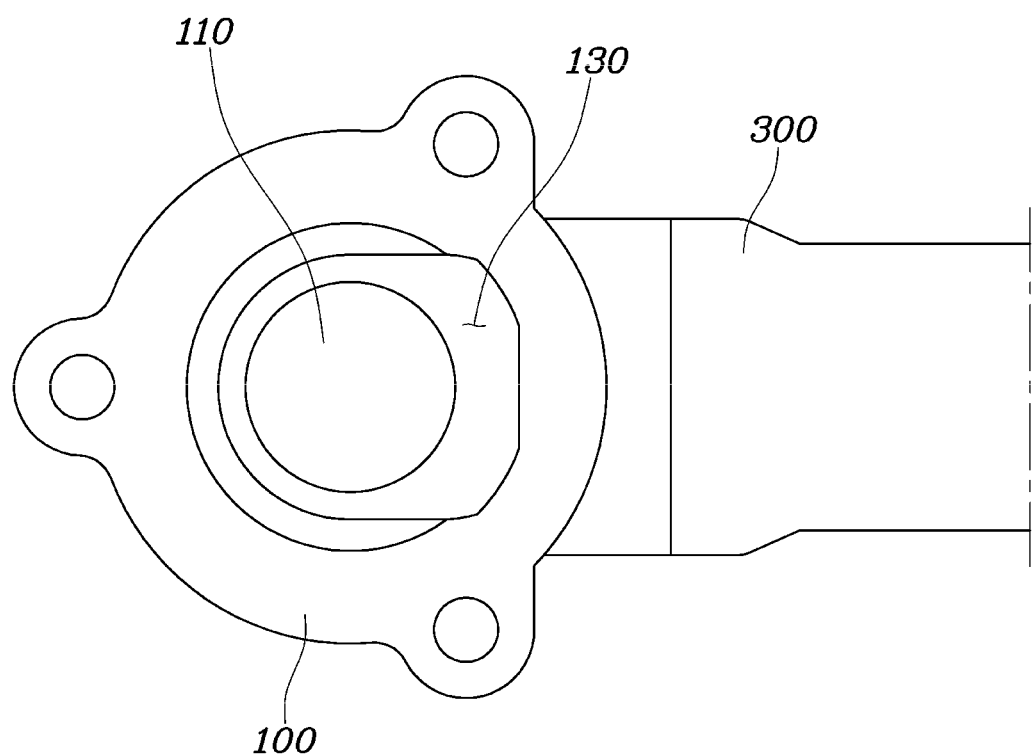
FIG. 5 is a plan view illustrating a recirculation valve adaptor according to an exemplary embodiment of the present invention.
Figure 6:
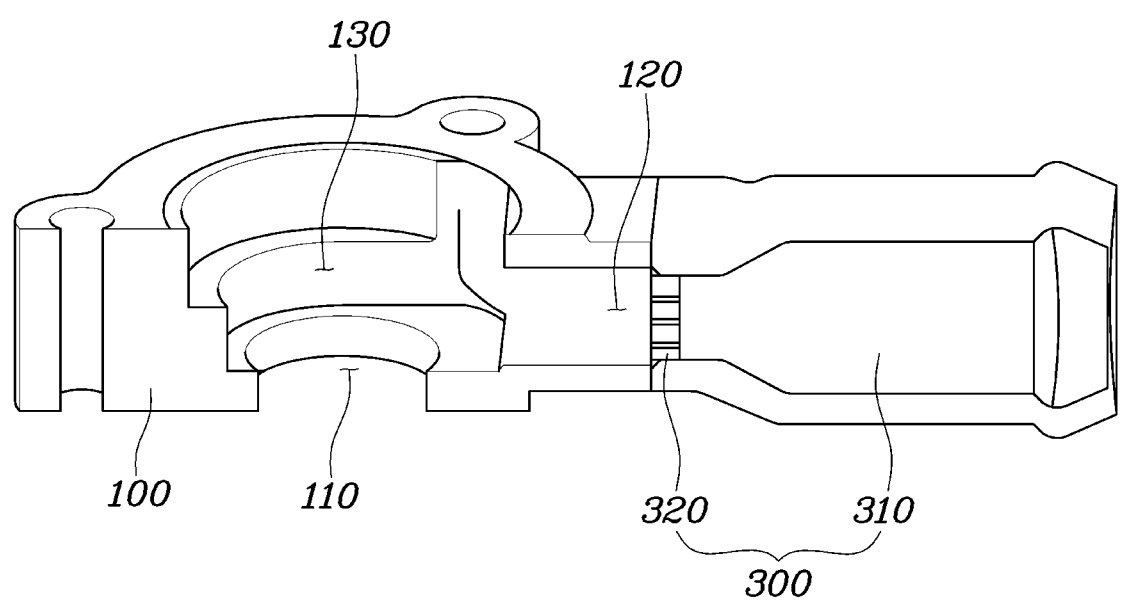
FIG. 6 is a partially cut perspective view illustrating the recirculation valve adaptor according to an exemplary embodiment of the present invention.

FIG. 5 is a plan view illustrating a recirculation valve adaptor according to an exemplary embodiment of the present invention and FIG. 6 is a partially cut perspective view illustrating the recirculation valve adaptor according to an exemplary embodiment of the present invention. As illustrated in FIGS. 5 and 6, a recirculation valve adaptor according to an exemplary embodiment of the present disclosure may have the inner space 130 formed in an asymmetric shape in which a width thereof is increased in a horizontal direction, that is, a direction of the outlet 120.

When the gas introduced through the inlet 110 flows in the direction of the outlet 120, a width of the second side of the inner space 130 in which the outlet is positioned may be formed to be wider than that of the first side of the inner space 130 with respect to the center of the inlet 110, thereby making it possible to minimize an occurrence of the regurgitation of gas at the rear of the inner space 130, that is, the second side thereof when the recirculation line is connected with the exhaust line by opening the recirculation valve for the turbo charger engine.

Thereby, it may be possible to reduce flow loss of the gas and to minimize the surge noise generated by collision between the regurgitated gas flow and a main gas flow introduced into the inlet 110 and moved in the direction of the outlet 120. In particular, in the recirculation valve adaptor 100 according to an exemplary embodiment of the present invention, when the recirculation line and the inlet 110 are connected with each other, since the circulation line is connected to a bottom of the recirculation valve adaptor 100, a convex-concave portion such as a protrusion or the like may not be formed in the inner space 130.

Accordingly, an occurrence of a turbulent gas flow by the convex-concave portion formed to connect the recirculation line and the inlet 110 with each other may be minimized, thereby making it possible to reduce the surge noise generated by the collision between the turbulent gas flow and the main gas flow, and a flow rate of the recirculated gas may be increased, thereby making it possible to minimize a noise occurrence time. Further, the inner space 130 of the recirculation valve adaptor 100 may be formed with a cross-section area thereof that increases upwardly from the inlet 110. In particular, the noise occurrence time may be minimized by further increasing the flow rate of the recirculated gas in the direction of the outlet 120. The recirculation valve for the turbo charger engine according to an exemplary embodiment of the present invention may further include a recirculation nipple 300 in which a plurality of guide apertures 321 may be formed to guide a flow of gas discharged from the outlet 120 and supply the gas to the recirculation line.

Figure 7:
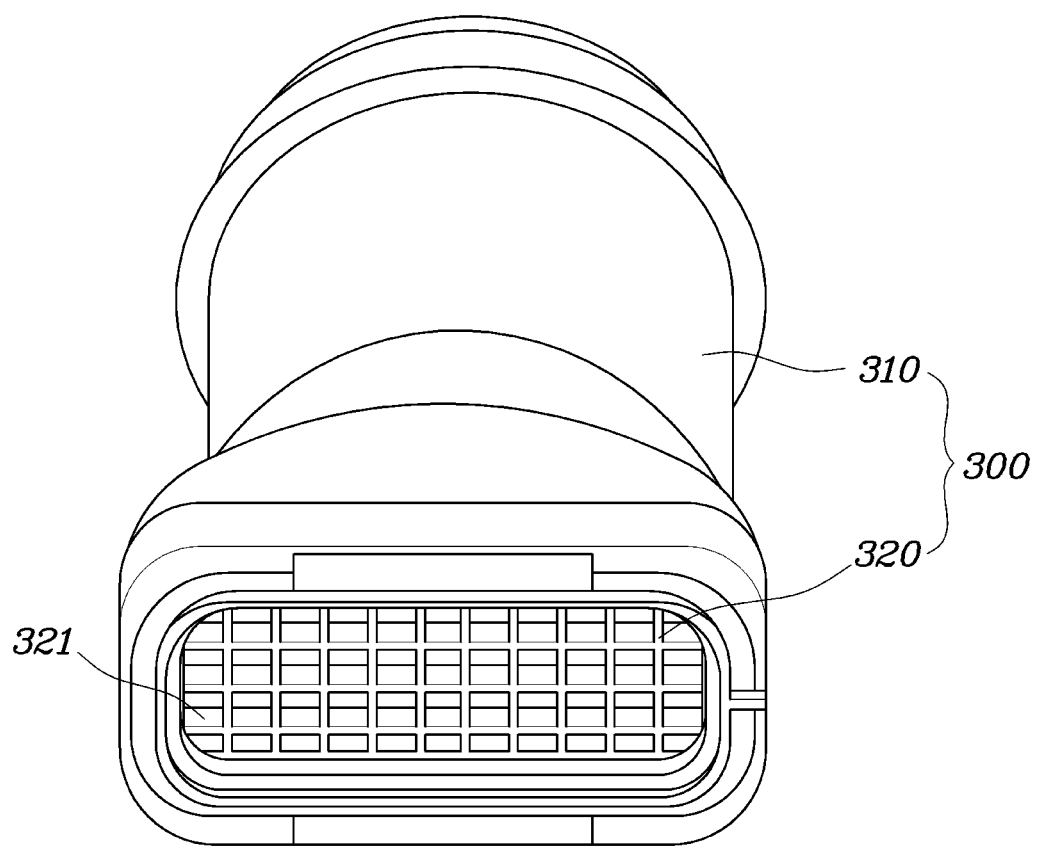
FIG. 7 is a perspective view illustrating a recirculation nipple according to an exemplary embodiment of the present invention.

FIG. 7 is a perspective view illustrating a recirculation nipple according to an exemplary embodiment of the present invention. As illustrated in FIG. 7, a recirculation nipple 300 according to an exemplary embodiment of the present invention may include a nipple body 310 having opposite ends connected to the recirculation line and the outlet 120, respectively, and a screen 320 having a plurality of guide apertures 321 formed therein and installed at a first side of the nipple body 310.

Particularly, the guide apertures 321 may have a predetermined length in a gas flow direction to guide a flow of gas passing through the outlet 120. Accordingly, a flow direction of the main gas flow including the turbulent flow generated while passing through the recirculation valve adaptor 100 may be guided while the main gas flow passes through the plurality of guide apertures 321 formed in the screen, thereby minimizing the turbulent flow in the main gas flow and minimizing the occurrence of the surge noise.

Further, the recirculation valve adaptor 100 according to an exemplary embodiment of the present invention may include the nipple body 310 and the screen 320 integrally molded from a plastic material. Accordingly, the weight of the recirculation valve adaptor 100 may be reduced, and the weight of the vehicle to which the recirculation valve for the turbo charger engine according to an exemplary embodiment of the present invention is applied may be decreased.

The outlet 120 according to an exemplary embodiment of the present invention may be a rectangular shape having a long length in a width direction thereof to correspond to a shape of the cross-section of the inner space 130 formed to have the width which is gradually increased along the main gas flow, as described above, and the nipple body 310 according to an exemplary embodiment of the present invention may have a first end connected to the outlet 120 and formed in a rectangular shape that corresponds to a shape of the outlet 120 and a second end of the nipple body 310 may be connected to the recirculation line and may be formed in a circular shape. In particular, a cross-section area of the nipple body 310 in the direction of the main gas flow may be formed to be the same as a cross-section area of the outlet 120 in an entire region. The occurrence of the surge noise may be minimized by reducing an occurrence of pressure loss in the gas flowing along the nipple body 310 due to expansion or contraction of the line and minimizing the occurrence of the turbulent flow due to a change in velocity and pressure of the gas.

According to the exemplary embodiments of the present invention, since the cross-section area of the inner space of the recirculation valve adaptor is gradually increased from the inlet to the outlet, the gas regurgitation may be prevented and the flow loss of the gas may be reduced, thereby reducing the surge noise. Further, since the gas line from the outlet of the recirculation valve to the nipple may be formed to have the same cross section, it may be possible to reduce the surge noise by minimizing the pressure change during the flow of gas. Further, the flow loss of the gas may be reduced by removing the step from the inlet of the recirculation valve adaptor, thereby making it possible to reduce the surge noise. The laminar flow screen is included in the nipple discharging the recirculated gas to change the gas flow to the laminar flow from the turbulent flow, thereby making it possible to minimize the surge noise.

As described above, although the present invention has been described with reference to the exemplary embodiments thereof, those skilled in the art will appreciate that various modifications and alterations may be made without departing from the scope and spirit of the invention as disclosed in the accompanying claims.

What is claimed is:

1. A recirculation valve configured to open or close a recirculation line, the recirculation valve comprising:
   a recirculation valve adaptor having an inlet into which gas is introduced formed in a bottom thereof, having an outlet from which the gas is discharged formed in a first side of a side surface thereof, and having an inner space connected to the inlet and the outlet and in which the gas flows;
   a plug configured to open or close the inlet and the outlet; and
   a recirculation nipple having a plurality of guide apertures configured to guide a flow of gas discharged from the outlet and supply the flow of gas to the recirculation line and having opposite ends connected to the recirculation valve adaptor and configured to be connected to the recirculation line, respectively,
   wherein the inner space has an asymmetric shape in which a width in a horizontal direction is increased in a direction from a second side of an inside surface to one side thereof,
   wherein the recirculation nipple includes:
   a nipple body of a pipe shape having a first side connected to the outlet and a second side configured to be connected to the recirculation line; and
   a screen having the plurality of guide apertures formed therein and installed at the first side of the nipple body, and
   wherein the nipple body has a first end connected to the outlet and having a cross section formed in a rectangular shape to correspond to a shape of the outlet and a second end having a cross section formed in a circular shape and configured to be connected to the recirculation line.

2. The recirculation valve of claim 1, wherein the plug is installed to be elevated in a vertical direction of the inner space, and an elevated height of the plug is a same height as a height in the vertical direction of the inner space.

3. The recirculation valve of claim 1, wherein the bottom of the recirculation valve adaptor is configured to be connected to the recirculation line via the inlet, and the inner space has a cross section area which is increased upwardly from the inlet.

4. The recirculation valve of claim 1, wherein the recirculation nipple is integrally molded by the nipple body and the screen formed of a plastic material.

5. The recirculation valve of claim 1, wherein the nipple body is formed to have a same cross section area as a cross section of the outlet in an entire region of an inner gas line in which the gas flows.

6. The recirculation valve of claim 1, wherein the cross section of the outlet is formed in the rectangular shape, and the outlet has a same cross section area as the recirculation line to which the outlet is configured to be connected.

* * * * *